No. 804,104.  
PATENTED NOV. 7, 1905.  
A. DE DION & G. BOUTON.  
FRICTION CLUTCH.  
APPLICATION FILED APR. 18, 1905.
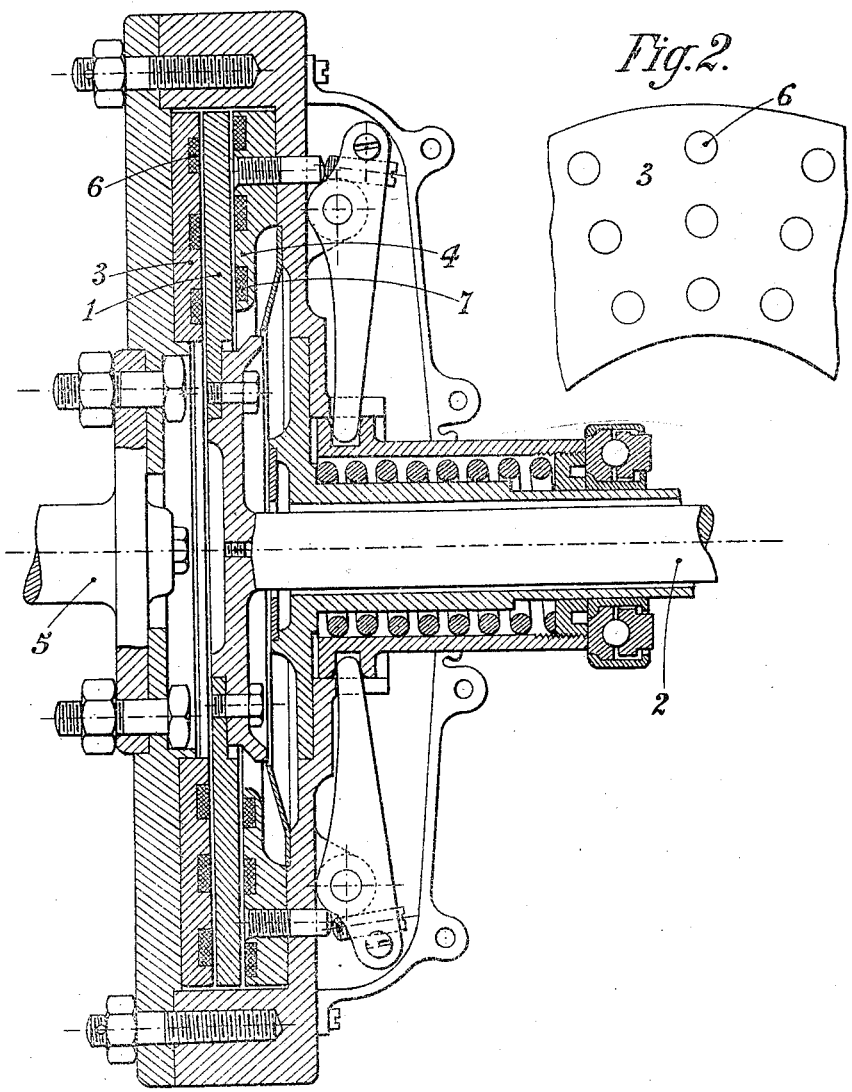
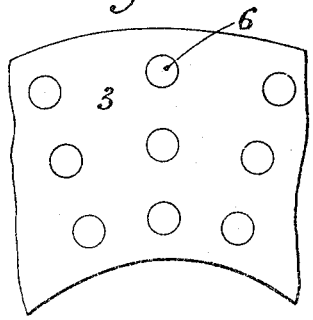

UNITED STATES PATENT OFFICE.

ALBERT DE DION AND GEORGES BOUTON, OF PUTEAUX, FRANCE.

FRICTION-CLUTCH.

No. 804,104. Specification of Letters Patent. Patented Nov. 7, 1905.

Application filed April 18, 1905. Serial No. 256,298.

*To all whom it may concern:*

Be it known that we, ALBERT DE DION, gentleman, and GEORGES BOUTON, engineer, citizens of the French Republic, residing at Puteaux, Department of Seine, France, have invented certain new and useful Improvements in Friction-Clutches, of which the following is a specification.

Most of the friction-clutches in use have the serious defect that the rubbing surface of at least one of the parts of the clutch is made of leather, a material which when heated becomes disintegrated or burns. If it be desired to employ metallic surfaces for both members of the clutch and if these surfaces be kept dry, a seizing or binding of the surfaces soon takes place. To avoid this, the surfaces are caused to rub on each other in oil. This oil, however, becomes heated and burns, leaving injurious residues. The adoption of this arrangement necessitates the use of a clutch-spring of increased power, because the coefficient of friction is greatly decreased by the interposition of the lubricant, or, again, it is necessary to multiply the rubbing surfaces, which renders the working parts of the clutch heavier and unsuitable for application to motor-cars fitted with sliding differential gear permitting of the differential gear being driven direct from the motor. This invention overcomes these disadvantages by providing a self-lubricating clutch.

The invention consists in inserting blocks of graphite or graphitic carbon in one or both of the surfaces that are to be brought in contact, the proportion of the metallic surface to the lubricating-surface being regulatable, so as to obtain a gradual-action clutch. This invention consists in the application to clutches of an invention already known as applied to the bearings of shafts. This means of lubrication requires no attendance, as the lubrication is effected by the working of the mechanism itself.

The accompanying drawings show an application of the invention to a friction-clutch described in the application for United States Letters Patent, Serial No. 250,319, filed March 15, 1905.

Figure 1 is a longitudinal section of a friction-clutch. Fig. 2 is a partial view of the rubbing disk.

The disk 1, fixed on the driven shaft 2, is mounted between two disks 3 and 4, which are rotated at the same speed as the driving-shaft 5. During the coupling and during the disconnecting the disk 1 rubs for a few moments against the disks 3 and 4. Blocks of graphite or graphitic carbon 6 7 are inserted in the disks 3 and 4. These blocks insure a dry lubrication by the working of the mechanism itself. The size, shape, and number of the blocks may be modified as required, and they may be inserted in the disk 1 or in the three disks 3, 4, and 1.

Having thus described and ascertained the nature of our invention and in what manner the same may be performed, we declare that what we claim is—

A friction-clutch having a contact-surface composed of alternations of metal and lubricating material, the lubricating material consisting in blocks of graphite or graphitic carbon inserted in the surface to be brought in contact, substantially as described.

In testimony whereof we have hereunto set our hands in presence of two subscribing witnesses.

ALBERT DE DION.
    GEORGES BOUTON.

Witnesses:
 PIERRE LEINE,
 EMILE KLOBE.